United States Patent
Eggleston

[11] Patent Number: 5,975,487
[45] Date of Patent: Nov. 2, 1999

[54] ROTARY VALVE ACTUATOR WITH HIGH-LOW-HIGH TORQUE LINKAGE

[75] Inventor: Philip Wayne Eggleston, Sherman, Tex.

[73] Assignee: Fisher Controls International, Inc., Clayton, Mo.

[21] Appl. No.: 08/844,700

[22] Filed: Apr. 25, 1997

[51] Int. Cl.$^6$ .................................................. F16K 31/145
[52] U.S. Cl. ................................. 251/58; 74/25; 74/469; 74/479.01; 251/229; 251/279
[58] Field of Search ........................... 251/58, 229, 279; 74/25, 469, 471, 479.01, 519

[56] References Cited

U.S. PATENT DOCUMENTS

| Re. 35,136 | 1/1996 | Hasegawa et al. | 92/99 |
|---|---|---|---|
| 362,767 | 5/1887 | McNair . | |
| 2,190,117 | 2/1940 | Griffith | 200/58 |
| 2,293,269 | 8/1942 | Rufus | 137/21 |
| 2,296,213 | 9/1942 | Kretzschmar | 267/1 |
| 2,305,099 | 12/1942 | Morris | 287/53 |
| 2,535,382 | 12/1950 | Bachli et al. | 287/53 |
| 2,641,280 | 6/1953 | Fleischhauer | 137/62.5 |
| 2,642,216 | 6/1953 | Carter | 226/116 |
| 2,707,966 | 5/1955 | Taplin | 137/116.5 |
| 2,722,881 | 11/1955 | Sutterfield et al. | 98/41 |
| 2,731,534 | 1/1956 | Hansen et al. | 219/4 |
| 2,870,873 | 1/1959 | Mueller | 188/33 |
| 2,878,701 | 3/1959 | Weersma | 81/71 |
| 3,011,758 | 12/1961 | McFarland, Jr. | 251/331 |
| 3,070,029 | 12/1962 | Russell | 103/150 |
| 3,082,792 | 3/1963 | Jenkins | 137/790 |
| 3,084,901 | 4/1963 | Thorburn | 251/61 |
| 3,175,472 | 3/1965 | Little | 92/94 |
| 3,195,418 | 7/1965 | Zukas | 91/416 |

(List continued on next page.)

FOREIGN PATENT DOCUMENTS

| A 0 192 973 | 9/1986 | European Pat. Off. . |
|---|---|---|
| 2 509 008 | 1/1983 | France . |
| 1944 871 | 2/1971 | Germany . |
| 23 34 336 | 1/1975 | Germany . |
| 2 343 069 | 2/1975 | Germany . |
| 23 43 069 | 2/1975 | Germany . |
| 42 44 573 | 7/1994 | Germany . |
| 56-63164 | 5/1981 | Japan . |
| 431 216 | 8/1967 | Switzerland . |
| 1 595 576 | 7/1969 | United Kingdom . |

OTHER PUBLICATIONS

Fisher Controls, "Type 657 and 667 Diaphragm Actuators," Bulletin 61.1:657, Apr. 1992.
Fisher Controls, "470 Series Piston Actuators," Billetin 61.2:470, Jul. 1993.
Fisher Controls, "Type 585 and 585R Piston Actuators," Bulletin 61.2:585, July 1993.
Computers Schlumberger, Division Controle Industriel, Technical File, FT50–37/C, "Servo–Moteur Pneumatique Reversible, Type KW," pp. 1–8, Mai 1976 (Translation supplied).

*Primary Examiner*—George L. Walton
*Attorney, Agent, or Firm*—Marshall, O'Toole, Gerstein, Murray & Borun

[57] ABSTRACT

A rotary valve actuator for fluid control valves having improved actuator linkage matching the torque requirements of most rotary shaft valves. A link member is pivotally interconnected to a linear movable actuating member and to a rotatable lever. The link member enables a high actuator torque to be developed and provided during the times when the valve requires a high torque, and a low actuator torque during other times when the valve only requires a lower torque. A high-low-high actuator torque is provided matching the high-low-high torque requirements of most rotary valves.

4 Claims, 2 Drawing Sheets

U.S. PATENT DOCUMENTS

| | | | |
|---|---|---|---|
| 3,224,345 | 12/1965 | Doetsch | 92/94 |
| 3,254,660 | 6/1966 | Ray | 137/66 |
| 3,275,286 | 9/1966 | Wood | 251/30 |
| 3,282,171 | 11/1966 | Tuckmantel | 92/99 |
| 3,434,395 | 3/1969 | Londal | 92/6 |
| 3,452,961 | 7/1969 | Forsman | 251/31 |
| 3,486,731 | 12/1969 | Magnani et al. | 251/58 |
| 3,513,059 | 5/1970 | Prohaska | 156/446 |
| 3,516,442 | 6/1970 | Munroe | 137/625.66 |
| 3,588,036 | 6/1971 | Harter | 251/61 |
| 3,610,571 | 10/1971 | Cisco | 251/63.6 |
| 3,717,322 | 2/1973 | Bernard | 251/61 |
| 3,719,199 | 3/1973 | Mentink | 137/269 |
| 3,719,343 | 3/1973 | Werra | 251/61.1 |
| 3,804,364 | 4/1974 | De Lepeleire | 251/43 |
| 3,814,119 | 6/1974 | Bertrand et al. | 137/86 |
| 3,817,452 | 6/1974 | Dean, Jr. | 236/49 |
| 3,845,783 | 11/1974 | De Lepeleire | 137/504 |
| 3,945,565 | 3/1976 | Lynch et al. | 236/49 |
| 3,958,592 | 5/1976 | Wells et al. | 137/315 |
| 3,963,377 | 6/1976 | Elliot et al. | 417/90 |
| 3,978,922 | 9/1976 | Johnson et al. | 166/224 A |
| 3,980,135 | 9/1976 | Garrett | 166/224 A |
| 3,982,558 | 9/1976 | Ochs | 137/455 |
| 4,003,547 | 1/1977 | Snyder et al. | 251/31 |
| 4,014,386 | 3/1977 | Johnson et al. | 166/321 |
| 4,017,025 | 4/1977 | Dravnieks et al. | 236/49 |
| 4,027,692 | 6/1977 | Bouteille et al. | 137/270 |
| 4,050,670 | 9/1977 | Borg et al. | 251/279 |
| 4,111,211 | 9/1978 | Olsen | 137/67 |
| 4,111,608 | 9/1978 | Elliot et al. | 417/112 |
| 4,147,094 | 4/1979 | Iguchi | 92/48 |
| 4,149,561 | 4/1979 | Dalton | 251/279 |
| 4,151,819 | 5/1979 | Inada et al. | 123/119 A |
| 4,178,938 | 12/1979 | Au | 128/207.15 |
| 4,187,764 | 2/1980 | Cho | 91/442 |
| 4,225,110 | 9/1980 | Akkerman et al. | 251/58 |
| 4,240,335 | 12/1980 | Stucka et al. | 92/96 |
| 4,261,546 | 4/1981 | Cory et al. | 251/58 |
| 4,278,108 | 7/1981 | Casacci | 137/613 |
| 4,295,630 | 10/1981 | Card et al. | 251/14 |
| 4,299,373 | 11/1981 | Troyer | 251/279 |
| 4,309,022 | 1/1982 | Reinicke et al. | 251/61.4 |
| 4,340,079 | 7/1982 | Smith et al. | 137/207 |
| 4,364,414 | 12/1982 | Bouteille et al. | 137/624.14 |
| 4,434,707 | 3/1984 | Takeuchi et al. | 91/376 R |
| 4,441,519 | 4/1984 | Terral | 137/15 |
| 4,480,811 | 11/1984 | Card et al. | 251/14 |
| 4,527,769 | 7/1985 | Stogner et al. | 251/14 |
| 4,545,433 | 10/1985 | Wambaugh | 166/105 |
| 4,546,953 | 10/1985 | Vinoiguerra et al. | 251/58 |
| 4,569,378 | 2/1986 | Bergandy | 141/266 |
| 4,572,237 | 2/1986 | Thompson | 137/287.5 |
| 4,582,082 | 4/1986 | Tosseghini | 137/270 |
| 4,604,944 | 8/1986 | Tsubouchi | 92/98 D |
| 4,732,189 | 3/1988 | Jones et al. | 137/220 |
| 4,783,046 | 11/1988 | Young et al. | 251/61.4 |
| 4,787,413 | 11/1988 | Saggers | 137/494 |
| 4,809,733 | 3/1989 | Hawkins | 251/62 R |
| 4,877,058 | 10/1989 | Stoll | 137/625.48 |
| 4,889,153 | 12/1989 | Zepernick et al. | 137/269 |
| 4,925,498 | 5/1990 | Kemmler | 137/382 |
| 4,930,555 | 6/1990 | Rudick | 141/98 |
| 4,977,922 | 12/1990 | McWilliams | 137/269 |
| 4,986,299 | 1/1991 | Schultz | 137/269 |
| 5,007,330 | 4/1991 | Scobie et al. | 92/120 |
| 5,016,856 | 5/1991 | Tartaglino | 251/61 |
| 5,029,806 | 7/1991 | Huo-Lien et al. | 251/14 |
| 5,069,248 | 12/1991 | Gill | 137/613 |
| 5,086,801 | 2/1992 | Peacock et al. | 137/12 |
| 5,101,853 | 4/1992 | Mailliet et al. | 137/242 |
| 5,275,014 | 1/1994 | Solomon | 62/324.1 |
| 5,277,397 | 1/1994 | Tartaglino | 251/61 |
| 5,279,325 | 1/1994 | Kaspers | 137/270 |
| 5,305,987 | 4/1994 | Baumann | 251/298 |
| 5,337,797 | 8/1994 | Janssen et al. | 141/206 |
| 5,348,270 | 9/1994 | Dinh | 251/61.1 |
| 5,357,999 | 10/1994 | Loth et al. | 251/62 R |
| 5,370,147 | 12/1994 | Brusse et al. | 137/15 |
| 5,469,774 | 11/1995 | Kaspers | 91/54 |
| 5,487,527 | 1/1996 | Eggleston | 251/62 |
| 5,507,467 | 4/1996 | Mott | 251/58 |

LOW TORQUE

HIGH TORQUE

LOW TORQUE

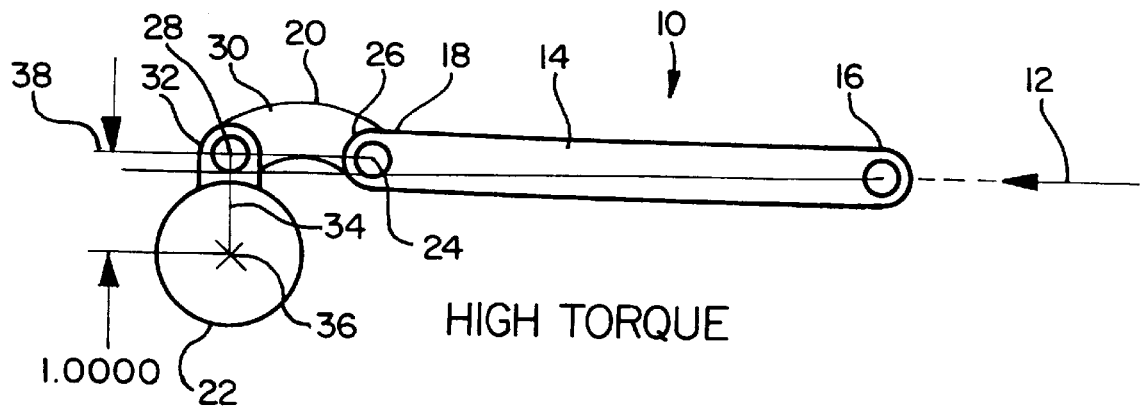
FIG. 2(a) HIGH TORQUE
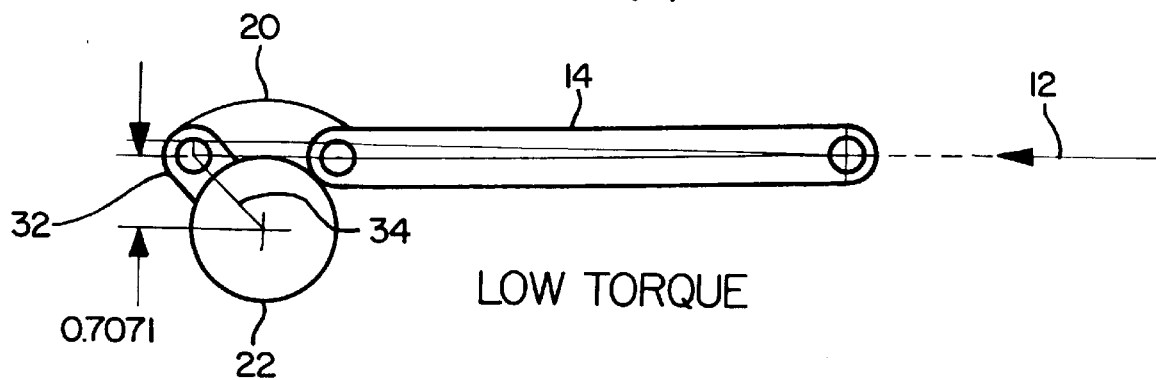
FIG. 2(b) LOW TORQUE
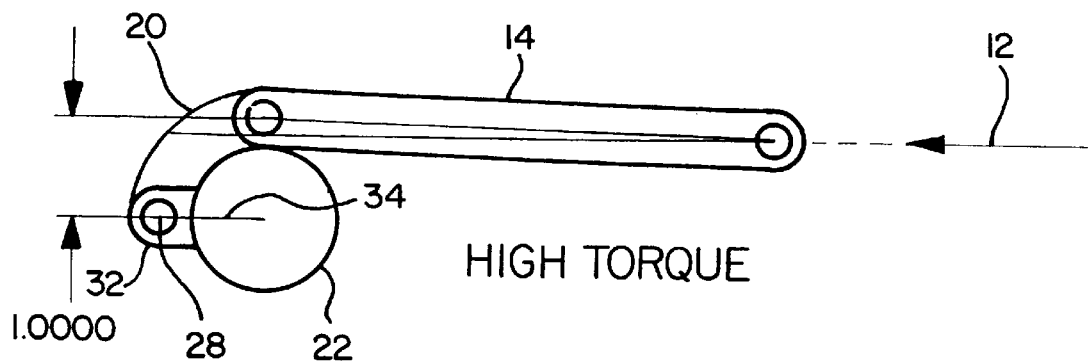
FIG. 2(c) HIGH TORQUE

ROTARY VALVE ACTUATOR WITH HIGH-LOW-HIGH TORQUE LINKAGE

BACKGROUND OF THE INVENTION

A variety of fluid flow control valves and corresponding valve actuators are utilized for on/off control or throttling the flow of fluid, such as in a gas or oil pipeline system, or in other process fluid systems. The fluid flow control valves are typically sliding stem control valves or rotary action control valves and are operated by a valve actuator such as a pneumatic piston or diaphragm actuator responding to the output of a valve positioner or valve controller instrument for accurate throttling control of the valve.

In the case of rotary action control valves, these units typically employ a flow control member in the form of a rotatable ball, rotatable ball segment, or a rotatable butterfly element. The rotation of the flow control element opens and closes the valve gate or plug.

Valve actuators for controlling such rotary action control valves typically employ a linearly movable member, such as a movable diaphragm connected to a rod at the diaphragm center. Moving the diaphragm displaces the rod linearly and thus requires a linear to rotary action translation. A rotational lever arm of a rotatable lever has one end fixed to the valve rotary shaft and the other lever arm end is coupled to the diaphragm rod. Linear movement of the diaphragm rod moves the lever arm, rotates the lever and thereby actuates a rotational movement in the valve shaft which is ultimately connected to the rotatable flow control element in the fluid control valve.

As noted previously, rotary actuators typically change linear motion to rotary motion using a ridged connection from the moving diaphragm rod to a rotational lever. Referring to FIG. 1(a) there is illustrated existing linkage in a rotary valve actuator wherein the lever arm 200 defined between the center of the rotatable lever 202 and the linkage point 204 with the actuator diaphragm rod 206 is at 45° to the centerline of the actuator diaphragm rod 206. The resultant torque lever arm (shown as 0.7071 reference length) is defined between the center of the lever 202 and the centerline of the actuator diaphragm rod.

As the diaphragm rod 206 pushes on the lever arm 200 in response to linear actuating movement of a movable actuator member 208, the lever arm rotates the lever 202 through 90° rotation. When the lever arm is again at 45° to the linkage centerline, as in FIG. 1(c), the torque lever arm at a reference length of 0.7071 is 30% shorter than when the torque lever arm is a reference length of 1.0 at 90° to the centerline as in FIG. 1(b).

Therefore, as the lever is rotated from the beginning of actuator travel as shown in FIG. 1(a), the actuator torque resulting from the torque lever arm and the driving linear actuator force is low. At the mid-travel position shown in FIG. 1(b), the actuator torque is high, and at the end of the travel position shown in FIG. 1(c), the actuator torque is again low. The typical rotary actuator therefore provides a low-high-low actuator torque output to the associated rotary valve during valve actuation.

However, during valve actuation most rotary valves require a high torque at the beginning of travel to rotate the valve disc, for instance, out of the valve seat. High torque also is required to seat the valve disc at the end of the travel. In other words a high-low-high actuator torque output is desired rather than the currently available low-high-low actuator torque output.

SUMMARY OF THE INVENTION

In accordance with the principles of the present invention there is provided a rotary valve actuator with a link member pivotally connected at each end to ridged linkage between a linearly movable member and a rotatable lever. This enables the actuator lever arm to be positioned 90° to the linkage centerline at the beginning of actuator travel and thereby provides the longest actuator torque lever arm. As the lever is actuably rotated to mid-travel, the torque lever arm is 30% shorter than in the initial actuator position. At the end of actuator travel, the torque lever arm is back to the same longest length as it was at the beginning of actuation. This provides a highly desired high-low-high actuator torque to match the torque required by most rotary valves during opening and closing of the valve disc or other valve closure members with respect to the valve seat.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

FIGS. 2(a), 2(b), 2(c) are schematic views illustrating a rotary valve actuator with improved torque linkage.

DETAILED DESCRIPTION

Figure 1A:
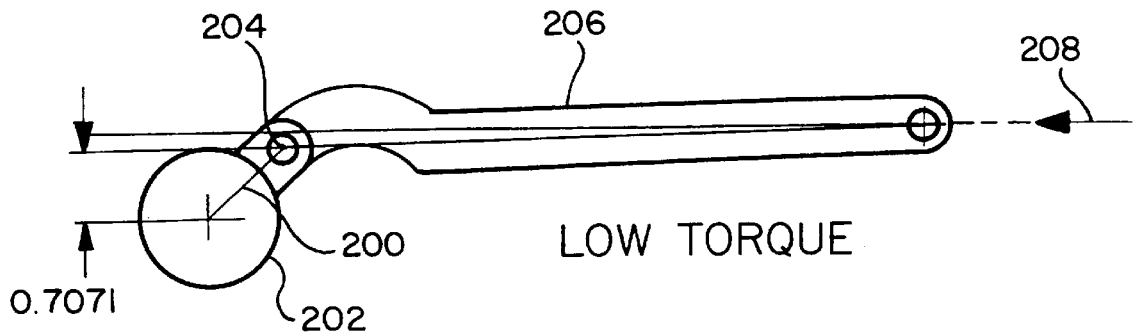
FIGS. 1(a), 1(b), 1(c) are schematic views illustrating a prior art rotary valve actuator with typical linkage between a linear movable actuator member and a rotatable lever.
Figure 1B:
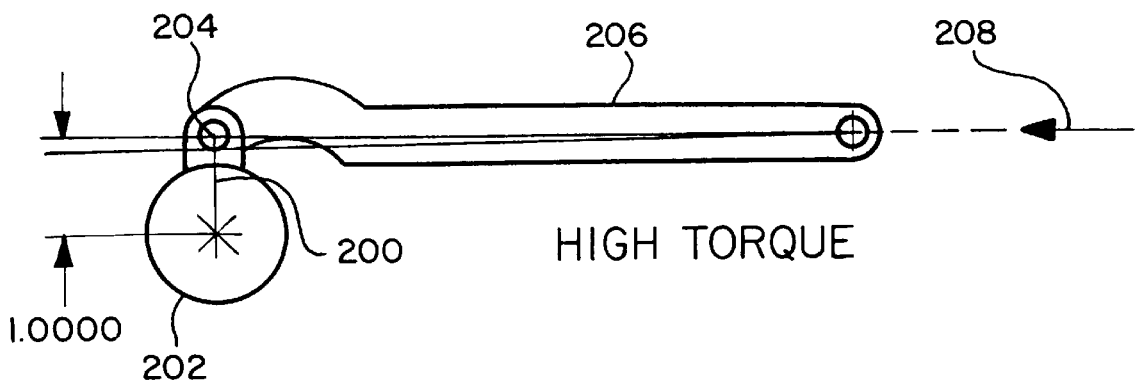
Figure 1C:
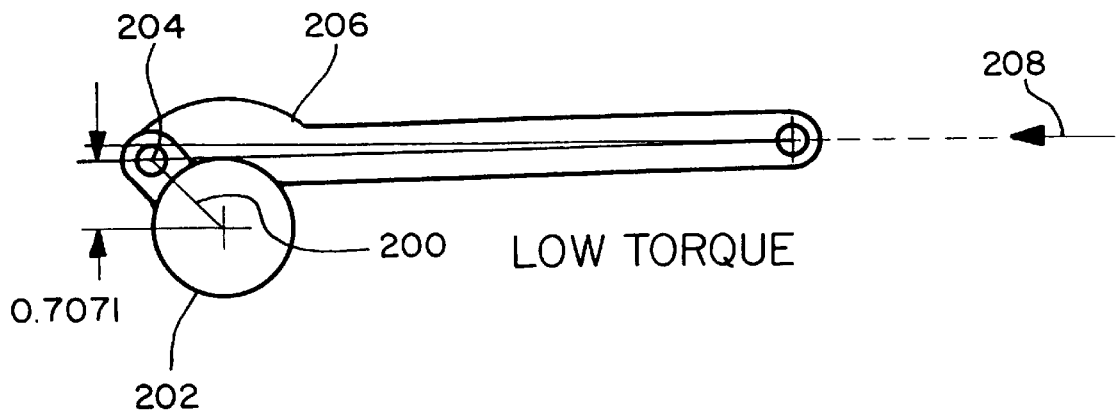

Referring to FIGS. 2(a), 2(b), 2(c), there is illustrated an improved rotary valve actuator 10 which includes a linearly movable member 12, and a rod 14 connected to the movable member 12 at one rod end 16 for driven linear movement. The linearly movable member 12 of available rotary actuators typically is a moving diaphragm under a pressure difference, or a moving canister driven by a pressurized bladder. The other rod end 18 is coupled by a link 20 to a rotatable lever 22 to transform the actuating linear movement of the movable member 12 to a rotary movement of the lever 22. In a known manner, the lever 22 is drivingly coupled to rotate a valve shaft of a fluid control valve.

A pivot connection 24 pivotally connects a link end 26 to the rod end 18. A similar pivot connection 28 pivotally connects a link end 30 to an upright boss 32 formed as a part of the lever 22.

It is to be understood that the actuator linkage is ridged and maintained in tension between the actuator linearly movable member 12 and the rotating lever 22. The pivotal connections 24, 28 do enable respective pivotal movement of link 20 in response to linear actuation of the rod 14, and rotational movement of the lever 22 in response to the pivoting of link 20.

As shown in FIG. 2(a), in this initial actuating position a lever arm 34 is defined between the lever center 36 and the linkage pivot connection point 28. Note that the lever arm 34 is at 90° to the linkage centerline 38. A reference number of 1.0 is indicated for the length of a resultant torque lever arm in FIG. 2(a) for comparison with the length of a resultant torque lever arm in FIGS. 2(b) and 2(c).

At this beginning of actuator travel the highest actuator torque is desired to rotate the valve closure member out of the valve seat. In response to linear actuation of the movable actuator member 12, the rod 14 is linearly driven to the left in FIG. 2(a) to pivotally drive the link 20 and rotate the lever 22 using the initial torque developed in accordance with the lever arm 34 at 90° with a reference length of 1.0.

FIG. 2(b) shows the actuator linkage position at actuator mid-travel wherein the lever 22 has been rotated through 45° from the initial actuation position of FIG. 2(a). At this mid-travel position the length of a resultant torque lever arm is seen as one leg of a 45° right triangle, and therefore can be calculated to be 0.7071 of the resultant torque lever arm length of FIG. 2(a). Note that the actuator torque is developed as a directly proportional product of the linear force from rod 14 and the length of a right angle torque lever arm. Thus, the actuator torque in FIG. 2(b) is 30% lower than in FIG. 2(a).

At the actuator mid-travel position of FIG. 2(b), the valve closure member has been rotated to its mid-travel point. Less actuator torque is required to rotate the valve shaft at the valve mid-travel position as compared to the initial valve position where the valve closure member has to be moved off the valve seat, or as compared to the end travel position where the valve closure member has to be seated on the valve seat.

As the actuator moving member 12 drives the rod 14 and the link arm 20 to rotate the lever 22 another 45°, the end travel position of FIG. 2(c) is reached. The length of the resultant torque lever arm is again at 1.0 as shown in FIG. 2(c), which means that the developed actuator torque is the same as in FIG. 2(a). It is understood that the initial and ending valve positions can be reversed from that described above, and the same high-low-high actuating torque is desired.

Therefore, the rotary valve actuator 10 with improved linkage according to the invention provides a high torque at initial actuation, a low torque at mid-travel, and a high torque at the end travel position. In other words a high-low-high actuating torque is provided as desired to match the requirements of most rotary shaft valves.

The link 20 enables the actuator to begin valve travel with the longest torque lever arm and to enable the lever 22 to rotate 90° to reach the end travel position with the same torque lever arm as initially. If link 20 is too short in length, the lever 22 will not be able to rotate the full 90° from the initial to the end travel position. If the link 20 is too long, the lever 22 can rotate the full 90°, but the actuator linkage becomes undesirably long. The link 20 should therefore match the contour of the rotatable lever. Also, a minimum length link 20 should permit full 90° rotation of lever 22 and have the end linkage pivot connection 28 travel the same 90°.

The foregoing detailed description has been given for clearness of understanding only, and no unnecessary limitations should be understood therefrom, as modifications will be obvious to those skilled in the art.

What is claimed is:

1. In a rotary valve actuator for controlling fluid flow through a rotary shaft control valve, including an actuator linear movable member, a rotatable lever coupled to said rotary shaft, and actuator linkage coupling the actuator linear movable member to said rotatable lever and defining a torque lever arm for converting linear movement of said movable member to rotary movement of said rotatable lever for rotating said rotatable lever in one rotatable direction from an initial actuating lever position corresponding to an initial high torque requiring position of said rotary shaft control valve, continuing rotation in said one rotatable direction to a mid-travel actuating lever position corresponding to a mid-travel low torque requiring position of said rotary shaft control valve, and continuing rotation in said one rotatable direction to an ending actuating lever position corresponding to an ending high torque requiring position of said rotary shaft control valve, the improvement comprising:

said actuator linkage including a link member pivotally connected at one end to said actuator linear movable member and pivotally connected at the other end to said rotatable lever;

said actuator linkage at said initial actuating lever position and at said ending actuating lever position providing said torque lever arm longer than the torque lever arm at said mid-travel actuating lever position to enable a high-low-high actuating torque capability of said rotary valve actuator during rotating of said rotatable lever in said one rotatable direction thereby matching said high-low-high torque requiring positions of said rotary shaft control valve.

2. A rotary valve actuator according to claim 1, wherein the link member enables the longest torque lever arm at said initial and ending actuator lever positions.

3. A rotary valve actuator according to claim 2, wherein said link member is contoured to match the contour of said rotatable lever.

4. A rotary valve actuator according to claim 3, wherein said link member pivot connection to said rotatable lever provides said torque lever arm at said initial and ending actuating lever positions equal to the length between the lever center and said pivot connection.

* * * * *